Figure 1A:
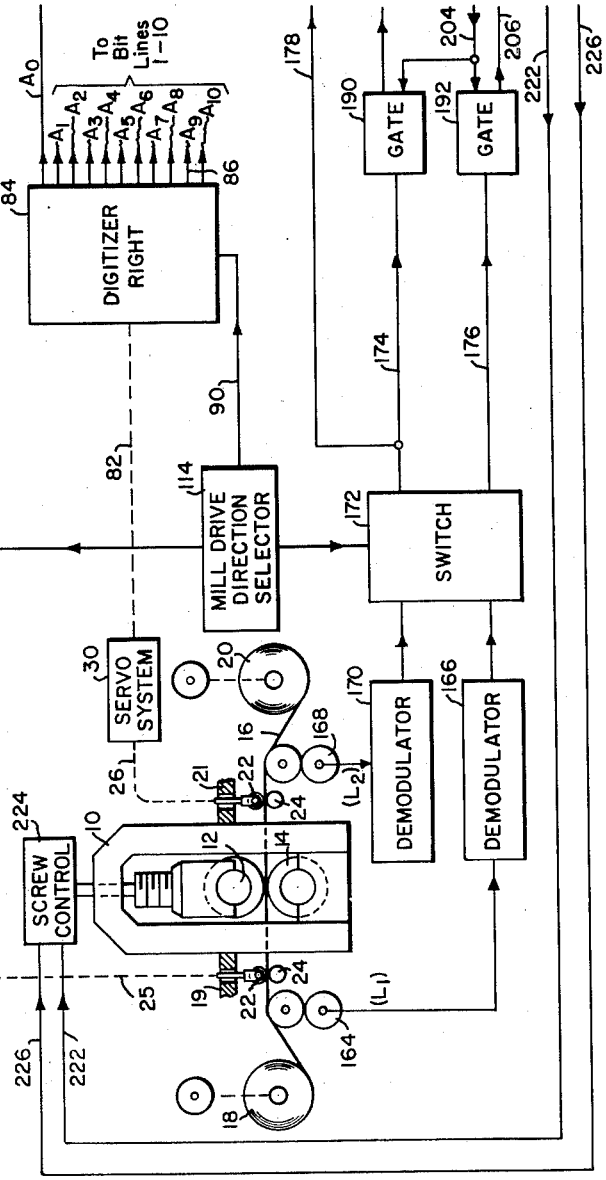

Feb. 18, 1964  E. A. WEREMEYCHIK ETAL  3,121,354
AUTOMATIC CONTROL SYSTEM FOR ROLLING
MILLS AND ADJUSTABLE DIES
Filed April 7, 1961  2 Sheets-Sheet 1

INVENTORS
James B. Murtland, Jr.
Eugene A. Weremeychik

BY
ATTORNEY

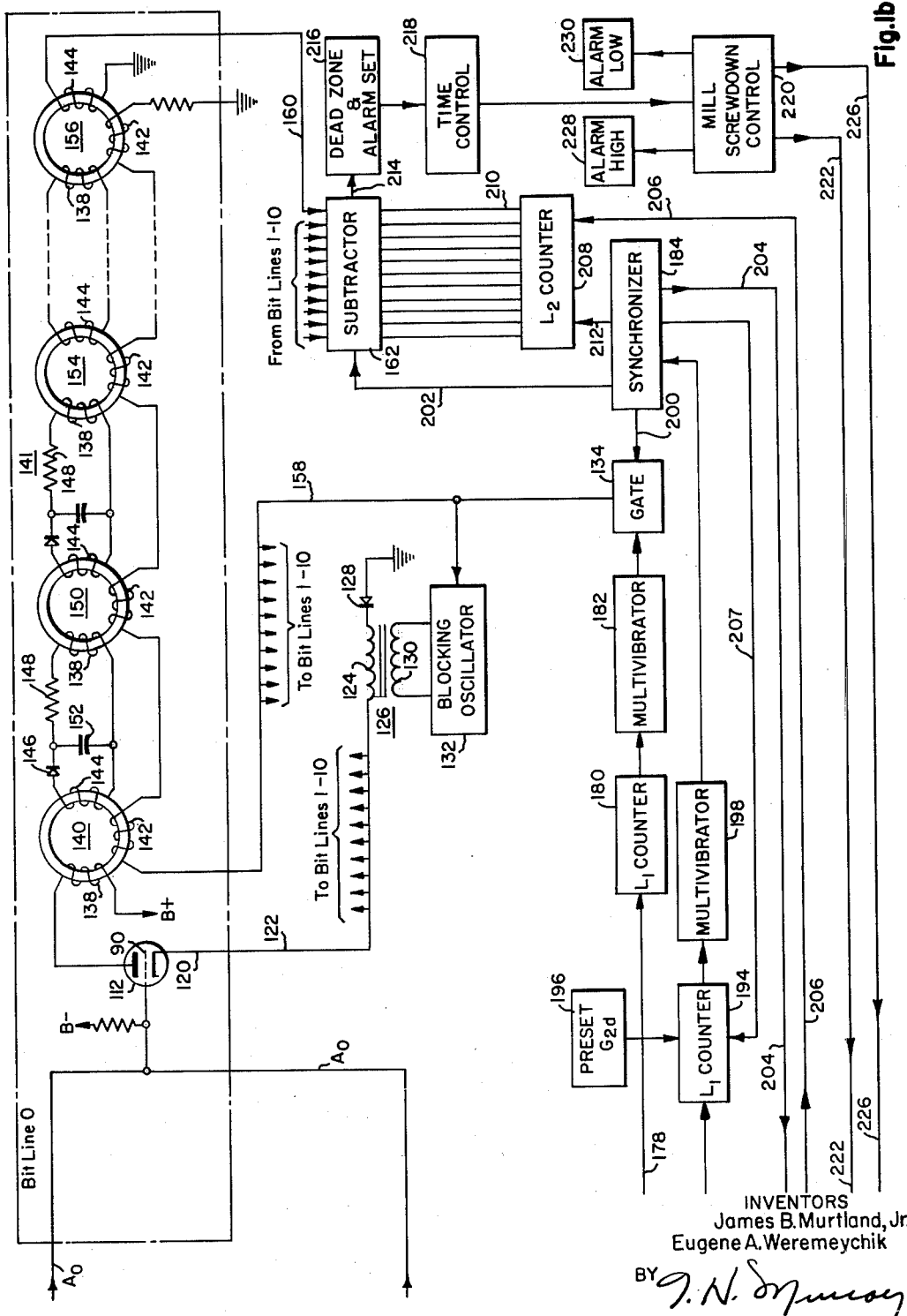

3,121,354
AUTOMATIC CONTROL SYSTEM FOR ROLLING
MILLS AND ADJUSTABLE DIES
Eugene A. Weremeychik, Brackenridge, and James B. Murtland, Jr., Tarentum, Pa., assignors to Allegheny Ludlum Steel Corporation, Brackenridge, Pa., a corporation of Pennsylvania
Filed Apr. 7, 1961, Ser. No. 101,535
8 Claims. (Cl. 80—56)

This invention relates to the production of material by rolling through single or multiple stand rolling mills or by drawing through single or multiple dies of the kind having opposed die surfaces whose separation is adjustable. More particularly, the invention relates to an automatic system for controlling such mills or dies so as to produce material of a predetermined desired uniform gage thickness.

In the majority of existing control systems for mills and dies, a mill screwdown or the like is controlled from a gage measurement taken several feet beyond the exit side of the mill, by an elongation or percent reduction measurement, or by a roll pressure measurement. In a system employing a gage measurement, the material, after reduction, progresses to the gage which may be several feet beyond the bite of the mill before any error present in the material thickness can be detected. This distance from the bite of the rolls to the gage is commonly referred to as "transport distance." The time required for the material to reach the exit gage is denoted as "transport time," while the time required to measure the strip gage is referred to as "sensing time." Transport time and sensing time are major elements in developing error commands. Transport distances of five feet or more are common in most of the commercial rolling equipment available at present, meaning that such a system would not be capable of detecting an error signal until five feet of material had passed from the bite of the mill rolls. The corrective signal would then be transmitted to the mill screwdown; but the measuring gage would not detect the result of this action until five feet more of the material had passed through the mill. With a high gain system of this type, a natural frequency of oscillation results; and if this oscillation is left to exist without any attempt to control it, the results would be undesirable. That is, for a material entering the mill with fairly noticeable changes in gage, the system described would cause wide variations in output gage that in all probability would eventually result in tearing of the strip. In an attempt to control the natural frequency of oscillation, some designers have damped their system so as to allow only a certain portion of the requested corrective signal after each measurement to be transmitted to the screwdown. Other designers have provided damping in the screws in order to slow down the response to any corrective signals. In any event, damping considerably reduces the efficiency and effectiveness of the control system. In a highly damped system, the result is a number of ensuing measurements before the material is brought within gage limits resulting in wasted material which has progressed from the mill before the desired gage can be obtained. In present day commercial mills, this loss is considerable.

A system employing elongation measurements as a means of control has one basic advantage—the transport distance of such a system is zero if the strip is under tension. In such a system length measuring devices are positioned at the entrance and exit ends of the mill. For a certain increment of length passing through the entering length measuring device, there will be an equal or greater increment of length measured at the exit device, this exit length being dependent upon the reduction effected by the mill. Since the transport time with the strip in tension is zero, the only time delay in the system will be the time involved in sensing sample lengths at the entrance and exit of the mill. These increments can be made so short as to be ignored. Although it would appear that an elongation type of system control would be desirable, further analysis shows a serious shortcoming of this system. An elongation system will only reduce the material a given percentage. Furthermore, this system does not control to a given gage unless the entering strip gage is constant. Since the gage of the entering strip varies, this type of control is an inaccurate means of gage control. To illustrate, let us assume that an increment of material 0.040 inch thick enters the mill followed by an increment 0.080 inch thick. It is further supposed that the opening between the mill rolls is such as to reduce the first increment to a thickness or gage of 0.020 inch. In doing so, the material must then have been elongated to twice its original length. When the second increment of material (0.080 inch thick) enters the mill, it will also be reduced to a gage of 0.020 inch. However, the elongation in this case is four times the original length; therefore, corrective mill action will be requested by the system in the second case. However, corrective mill action is not desired since the exit gage or thickness is in both cases alike. Thus, it can be seen that a system employing elongation measuring methods alone is not feasible for gage control.

Systems utilizing roll pressure measurements as a means of control leave much to be desired when precision control of strip gage is required. First, an inherent factor in a pressure measuring system is the natural spring of the mill housing. There is no reasonable means of keeping the mill housing rigid under the extreme forces encountered in rolling. Compensating for this housing spring is possible; however, a second disadvantage still exists in a roll pressure measuring system. This appears as a result of differences in material hardness at different points in a strip. That is, hard materials will not be reduced as much as soft materials under certain roll pressure conditions.

The present invention is an outgrowth of a recently developed method for rolling mill control based on the concept that the volume of material coming out of the mill must be equal to the volume entering the mill. With this system, the transport time is zero and the measuring time is essentially zero also, meaning that the system measures and controls the mill or other similar device directly at the bite of the mill. Thus:

$$V_1 = V_2$$

and (1) $$L_1 W_1 G_1 = L_2 W_2 G_2$$

where $L_1$ = length of material entering the mill;
$L_2$ = length of material leaving the mill;
$G_1$ = gage of material entering the mill;
$G_2$ = gage of material leaving the mill;
$W_1$ = width of material entering the mill; and
$W_2$ = width of material leaving the mill.

Previous to this invention, rolling mill control systems based on the constant volume principle derived an error signal for the rolling mill screwdown by calculating the desired input gage ($\overline{G}_1$) from the other variables of $L_1$, $W_1$, $L_2$, $W_2$ and $G_2$ and then comparing this calculated desired input gage against the actual measured value of input gage $G_1$. Equation-wise, this may be written:

(2) $$\overline{G}_1 = \frac{L_2 W_2 G_2}{L_1 W_1}$$

and $$\text{Error} = G_1 - \overline{G}_1 = G_1 - \frac{L_2 W_2 G_2}{L_1 W_1}$$

As will be understood, the output gage of the strip or other workpiece is the factor to be controlled by the system. Therefore, predetermined desired output gage $G_{2d}$ is introduced into the system which alters the foregoing equation as follows:

(3) $$\text{Error} = G_1 - \frac{L_2 W_2}{L_1 W_1} G_{2d}$$

At the same time, the use of desired output gage $G_{2d}$ rather than actual output gage $G_2$ renders the system capable of control "before the fact" rather than "after the fact." In other words, the system will not need to wait until the material has progressed beyond the bite of the mill before recognizing and deciding on the necessary control operation.

Furthermore, such prior art systems operated on the assumption that the input width $W_1$ varied from the output width $W_2$ by a constant error factor. This factor was represented as W and introduced into the equation as follows:

(4) $$\text{Error} = G_1 - \frac{L_2}{L_1} G_{2d} W$$

The equation was then complete except for a second error factor K which was introduced to take care of any deviations in the dimensions of the gages employed to measure the factors $L_1$ and $L_2$. Thus, the equation became:

(5) $$\text{Error} = G_1 - \frac{L_2}{L_1} G_{2d} W K$$

Although a system based upon the foregoing equation will operate satisfactorily for its intended purpose, the factors W and K greatly complicate the electrical computer circuitry required to compute the factor $$\frac{L_2}{L_1} G_{2d} W K$$

Specifically, the computation of $W \times K$ requires a considerable amount of time as well as a great deal of complicated computer circuitry.

As an overall object, the present invention seeks to provide a new and improved automatic control system for rolling mills or systems employing adjustable dies which measures gage and controls the mill or dies at the bite of the mill.

More specifically, an object of the invention is to provide an automatic control system of the type described which is greatly simplified over previous constant volume control systems in that it eliminates the factors W and K discussed above and the attendant computer circuitry required to introduce these factors into the error signal equation.

Still another object of the invention is to provide an automatic control system for rolling mills and the like which is greatly simplified over previous systems in that it eliminates many of the circuit components, over and above those required to introduce the aforesaid W and K factors into the error equation, which were heretofore believed necessary for the successful operation of a rolling mill control system of this type to obtain a uniform output gage.

Among other things, the present invention resides in the discovery that contrary to what is expected, the W and K factors may be eliminated from the rolling mill control system, notwithstanding the fact that the entire system is based upon the premise that the volume of material entering the mill is equal to that leaving the mill. Thus, although a system of this sort would logically require that the width of the strip entering and leaving the mill be taken into consideration as a separate factor, it has been found that variations in width as well as variations in gage rolls and other variables may be eliminated without sacrificing the desired result which is an output strip of constant and uniform gage. This not only simplifies the computation of the error equation, but also greatly decreases the amount of circuitry required to effect the desired result.

In accordance with another aspect of the invention, much of the equipment heretofore believed necessary in a constant volume control system has been eliminated. For example, it is necessary in a gage control system based on the constant volume principle to advance entry gage measurements through an entry gage storage unit in synchronism with the movement of strip material. In the past, it was believed necessary to clear this storage unit of previously stored entry gage information before initiating gage measurements on a succeeding strip. This, however, is unnecessary since, although the gage measurements will be erroneous until the strip has travelled a distance sufficient to clear the storage unit, this amount of strip travel is only a small increment of the total strip length and can be scrapped if necessary. At the same time, the complicated circuitry required to clear the storage unit is completely eliminated from the control system.

Figure 2:
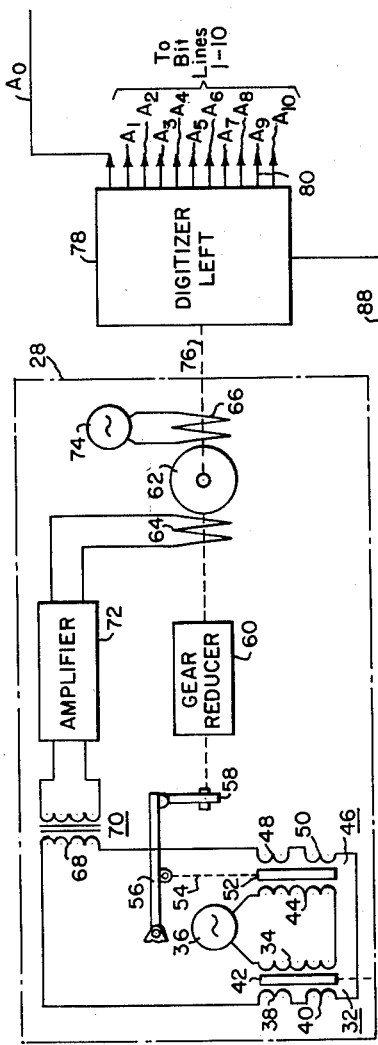
Figure 2:
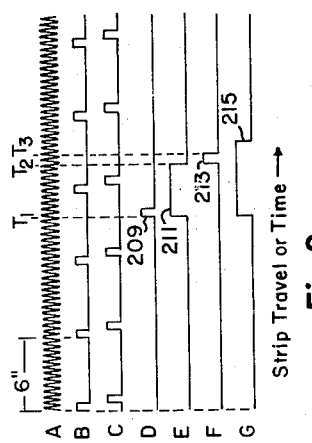

The above and other objects and features of the invention will become apparent from the following detailed description taken in connection with the accompanying drawings which form a part of this specification, and in which:

FIGURES 1a and 1b form a composite overall schematic and block diagram of the gage control system of the invention; and FIG. 2 is an illustration of wave forms appearing at various points in the circuit of FIGS. 1a and 1b.

Referring now to the drawings, and particularly to FIGS. 1a and 1b, a conventional rolling mill 10 is provided with pressure rolls 12 and 14 between which passes the material 16 being acted upon or processed in the mill. In the particular illustration given, the material 16 comprises a continuous strip which feeds off payoff reel 18 and is coiled onto take-up reel 20. However, the direction of movement of the strip material through the mill 10 may be reversed, whereupon the reel 20 will become the payoff reel and reel 18 will become the take-up reel.

Positioned on either side of the mill 10 are a pair of gage heads 19 and 21, each of which supports a vertically movable roller 22 positioned above the strip as well as a fixed roller 24 below the strip. Connected to the vertically movable rollers 22 through linkages 25 and 26 are servo systems 28 and 30, respectively. Only the servo system 28, enclosed by broken lines, is shown in detail herein, it being understood that the other servo system 30 is identical in structure and operation. As the strip 16 passes through the gage head 19, for example, the gaging rollers 22 and 24 will be in rolling contact with its opposite surfaces; and as the thickness or gage of the material varies, the upper gaging roller 22 will move upwardly or downwardly, depending upon whether the strip 16 increases or decreases in thickness. That is, when the thickness of the strip 16 increases, the gaging roller 22 and linkage 25 will move upwardly; whereas, when the thickness of the sheet decreases, these members will move downwardly.

In order to sense the position of the gaging roller 22 and linkage 25, there is provided an electromechanical transducer, generally indicated at 32, which produces an electrical output which varies in proportion to the movement of roller 22. The transducer includes a center or primary coil 34 which is connected to a source of alternating current 36. At either end of the primary or center coil 34 and coaxial therewith are a pair of secondary coils 38 and 40. A rod-shaped magnetically permeable core 42 is positioned axially inside the coil assembly and provides a path for the magnetic flux linking the coils. Core 42 is connected to the linkage 25 whereby the coil will be moved upwardly or downwardly depending upon the direction of movement of the roller 22. In series with the primary winding 34 of transducer 32 is the primary winding 44 of a second electromechanical transducer 46 which is similar in construction to transducer 32 and includes a pair of secondary coils 48 and 50 as well as a movable, magnetically permeable core 52. In this case, however, the core 52 is connected through a mechanical linkage 54 to a lever 56 which is controlled by means of a cam 58. The cam 58, in turn, is connected through gear reducer 60 to a two-phase servomotor 62 having two phases or windings 64 and 66 included therein.

With reference to transducer 32, when the primary or center coil 34 is energized with alternating current from source 36, voltages are induced in the other two coils 38 and 40. These secondary coils are connected in series opposition, meaning that the two voltages in the secondary circuit are opposite in phase whereby the net output of the transformer is the difference of the voltages. For one central position of the core, this output voltage will be zero. When the core 42 is moved from this central position, the voltage induced in the coil toward which the core is moved increases, while the voltage induced in the opposite coil decreases. This produces a differential voltage output which with proper design varies linearly with a change in core position. The motion of the core in the opposite direction beyond the central position produces a similar linear voltage characteristic, with the phase shifted 180°. Operation of transducer 46 is identical to that of transducer 32 and, thus, by proper positioning of the cores 42 and 52 in the respective transducers, the cumulative or output voltage produced across their respective secondary windings can be made equal and opposite in phase. These secondary windings are connected in series differential across the primary winding 68 of an input transformer 70. Thus, when the output voltages produced across the secondary windings of the respective transducers are equal and opposite in phase, the voltage appearing across the primary winding 68 will be zero. If the cores 42 and 52 are initially positioned so that zero output voltage is produced across winding 68, and if core 42 is thereafter moved upwardly, the output voltages produced across the secondary windings of the transducers will no longer balance, and a voltage will appear across winding 68. If the core 42 moves downwardly from a balanced condition, then a voltage will again appear across winding 68, but in this case it will be shifted in phase with respect to the voltage produced when it moved upwardly from the balanced condition. The voltages appearing across the secondary winding of transformer 70 are applied to an amplifier 72, the output of which is connected across one of the windings 64 of the two-phase servomotor 62. The other winding 66 of servomotor 62 is connected as shown to a source of alternating current voltage 74 which is in phase with voltage source 36. In actual practice, the two voltage sources 36 and 74 will probably be the same, but are shown herein separately for purposes of explanation.

With the arrangement described, the servomotor 62 will rotate in one direction or the other, depending upon the phase of the signal applied through winding 64. This phase will, in turn, depend upon the relative positions of cores 42 and 52 in their respective transducers as was explained above.

The gear ratio of gear reducer 60 is on the order of two-hundred to one, meaning that servomotor 62 will have to make two-hundred revolutions before the cam 58 rotates through 360°. The arrangement is such that if core 42 in transducer 32 moves upwardly, for example, motor 62 will rotate the cam 58 to lower core 52 in transducer 46 until the voltages at the secondaries of the transducers balance and the servomotor stops. That is, as the core of transducer 32 is moved upwardly by roller 22 in response to an increase in the thickness of strip 16, the coupling is increased between its primary winding 34 and secondary winding 38, and the voltage applied to the amplifier 72 increases. With this increase in voltage, the servomotor 62 drives the core of transducer 46 downwardly until the output voltages at the respective secondary windings are equal and the voltage appearing across winding 68 of input transformer 70 is zero. At this point the motor stops, and what has actually been done is to convert an electrical signal proportional to the change in strip thickness into a proportional rotary motion of the servomotor 62. That is, any change in thickness of the strip 16 as it passes through the gage head will induce a proportional number of revolutions in the servomotor 62 until the two transducer outputs again balance. If the thickness of the strip 16 decreases and the core 42 moves downwardly, the phase of the signal applied to the servomotor 62 will be reversed, and the cam 58 will be rotated to lower the core 52 in transducer 46.

The servomotor 62 is also connected through a mechanical connection 76 to a binary digitizer, generally indicated at 78. The digitizer is essentially a rotary switching device for energizing particular relays which represent bits in a binary number. In the particular illustration given, the digitizer 78 will produce an electrical signal comprising eleven binary output bits which appear on leads 80. For a full and complete description of the digitizer, reference may be had to copending application Serial No. 544, filed January 5, 1960, now U.S. Patent 3,056,208 and assigned to the assignee of the present application. Although the digitizer shown in that application produces a decimal rather than a binary output, the conversion from decimal to binary notation will be obvious to those skilled in the art. Thus, a binary number A, for example, will be represented by ($A_0$, $A_1$, $A_2$, $A_3$, etc.) where $A_0$ is the binary bit $2^0$, $A_1$ is the binary bit $2^1$, $A_2$ is the binary bit $2^2$, $A_3$ is the binary bit $2^3$, and so on. Each of the binary bits is represented on leads 80 by an ON or OFF signal, representing a "one" or "zero," respectively in binary notation. Thus, if the output leads from the digitizer 78 representing the $A_0$ and $A_3$ bits are ON or "one" while all other leads are OFF or "zero," it means that the output of the digitizer is $2^0 + 2^3$, or $1+8$ which is 9. Similarly, if only the $A_1$ and $A_2$ leads are On or "one" while all other leads are OFF or "zero," the signal represented is $2^1 + 2^2$, or $2+4$ which is 6. Also included in the servo system 28 is apparatus, not shown, for automatically zeroing the system when the two rollers 22 and 24 are in contact with each other. This apparatus forms no part of the present invention, but is fully shown and described in the aforesaid U.S. Patent 3,056,208.

As shown in FIG. 1a, the servo system 30 is also connected through a mechanical linkage 82 to a second digitizer 84 having eleven output leads 86. The corresponding output leads from the digitizers 78 and 84 are each connected to a bit line, only one of said lines being shown in detail in FIG. 1b and identified as "bit line 0." Thus, the $A_0$ leads from both digitizers 78 and 84 are connected to bit line 0, the $A_1$ leads from each digitizer will be connected to bit line 1, the $A_2$ leads from each digitizer will be connected to bit line 2, the $A_3$ leads from each digitizer will be connected to bit line 3, and so on.

Included in the circuit is a mill drive direction selector 114 which, among other things, serves to control the mill drive, not shown, to selectively reverse the direction of strip movement through the mill. The mill drive direction selector also controls the digitizers 78 and 84 through leads 88 and 90, respectively. That is, when the strip is moving from left to right as shown in FIG. 1a, the selector 114 will serve to enable or switch on the digitizer 78 whereby binary bits will appear on leads 80. At the same time, the selector 114 applies a signal to lead 90 to disable or switch off the digitizer 84. When, however, the direction of strip movement is reversed (i.e., from right to left in FIG. 1a) digitizer 78 will be disabled while digitizer 84 is enabled to produce binary bits on output leads 86. Thus, only one set of binary bits from digitizer 78 or 84 will pass into the respective bit lines 0–10.

All of the bit lines 1–10 are identical in construction to bit line 0 shown in detail in FIG. 1b. With reference to this first bit line, it includes an electron valve 112 having its grid 90 connected to the $A_0$ leads from each of the digitizers 78 and 84, it being understood that only one of these leads will be operative to pass ON signals at any time, depending upon the direction of strip movement through the mill. The cathode 120 of valve 112 is connected through lead 122 to one end of the secondary winding 124 of a transformer 126, the other end of the winding 124 being connected through a unidirectional current device 128 to ground. The primary winding 130 of transformer 126 is connected to a blocking oscillator 132 which receives a trigger pulse from a gate circuit 134, the arrangement being such that the output of the blocking oscillator will be a pulse each time a trigger pulse is received from gate circuit 134, however the output pulse of the blocking oscillator will be delayed with respect to the input trigger pulse from circuit 134. The delayed output pulse from the blocking oscillator is then coupled through transformer 126 to lead 122 to thereby apply a negative potential to the cathode 120 and enable the electron valve 112 to pass ON signals from digitizer 78 or 84 as the case may be. At all other times, however, the valve 112 is disabled. Lead 122 is also connected to the cathodes 120 in each of the remaining bit lines 1–10 where the action is the same as that described with respect to bit line 0.

The anode 136 of the tube 112 is connected to a source of anode voltage, designated B+, through the input winding 138 of a first circular magnetic core 140 in an entry gage memory unit 141 which serves to store and advance successive actual entry gage measurements from valve 112 in synchronous correlation with the movement of strip 16. That is, each time the valve 112 is enabled by blocking oscillator 132, it feeds the instantaneous entry gage measurement in binary form from digitizer 78 or 84 to the storage unit which progressively advances these instantaneous measurements from one end of the unit to the other end, the time required to advance from one end to the other being equal to the time required for the strip 16 to travel from the rollers 22 and 24 to the bite of the mill 10.

Also included on the core 140 in the memory unit is a shift winding 142 and an output winding 144 which is connected through diode 146 and resistor 148 to the input winding 138 of a second circular magnetic core 150. As shown, a capacitor 152 is connected between the junction of diode 146 and resistor 148 and the other end of the output winding 144. Core 150 is identical to core 140 and includes an input winding 138, a shift winding 142 and an output winding 144. Core 150, in turn, is coupled to core 154 and this core, in turn, is connected to the next succeeding core in the chain. In the particular embodiment of the invention shown herein, it will be assumed that there are ten such cores connected in cascade, the last or tenth core being designated by the numeral 156.

Each of the cores 140, 150, 154, etc. is formed from permanent magnet material and may have flux remaining in either of two directions depending upon the last direction of the magnetizing current. In the illustration given, the input current in winding 138 can cause flux to flow in core 140, for example, in a clockwise direction while the shift current in winding 142 can cause flux in the counterclockwise direction. Current will flow in the output diode 146 only when the flux changes from clockwise to counterclockwise direction. Thus, a "one" or ON bit can be stored in the first core 140 by pasing current through the input winding 138. The "one" or ON bit can then be transferred to the second core by passing current through the shift winding 142. As shown, all of the shift windings 142 are connected in series to lead 158 which, in turn, is connected to the output of gate circuit 134. Consequently, all of the cores in the chain are shifted simultaneously. When a shift pulse is applied to the shift windings 142, a "one" or ON bit in the first core 140, for example, will be transferred to the second core 150. As the flux changes, the diode 146 conducts and stores a charge in the capacitor 152. Before the capacitor 152 can discharge, however, the core 150 will have already received a shift pulse to transfer its information onto core 154. Thus, when the capacitor 152 does discharge, the information which was stored on the first core is transferred to the second core 150 by action of the capacitor 152 discharging through the input winding 138 of this core. Information can flow only one way due to the diode and due to the ratio of turns between the input and output windings. Thus, the capacitors 152 act as a temporary storage medium while the cores are reset to zero. If there is no input current before the next shift current pulse, the first core will be in the "zero" state with counterclockwise flux. Hence, the shift current cannot change the flux, no current will charge the capacitor, and the following core will remain reset, thus shifting the "zero" or OFF binary bit from the first core to the second core.

With the arrangement described, each bit will be transferred from one core to the other until the final core 156 is reached. The output winding 144 of this core is then connected through lead 160 to a parallel binary subtractor 162 which also receives the outputs from the other bit lines 1–10. As the input gage of the strip material varies, this variation will be detected by the servo system 28 so that the output of digitizer 78, for example, will be constantly changing, assuming that the input gage is also changing. However, by virtue of the fact that the electron valve 112 conducts only at periodic intervals, samples of the input gage will be passed through bit lines 0–10 at periodic intervals also. As will hereinafter be explained, a sample of the input gage is passed to the cores 140, 150, 154, etc. each time the strip 16 moves through six inches of travel. Since there are ten such cores connected in cascade, the strip will have to travel sixty inches or five feet before the output information arrives at the binary subtractor 162. By positioning the rollers 22 and 24 five feet from the bite of the mill, it will be appreciated that when the input gage information arrives at the subtractor 162, the increment of strip having that particular gage will be directly at the bite of the mill.

Reverting again to the rolling mill 10, input strip length ($L_1$) is sensed by equipment similar to that described in copending application "Elongation Control System," Serial No. 680,349, filed August 26, 1957 and now U.S. Patent 2,982,158, namely a pulse generator 164 and a demodulator unit 166. Similarly, output strip length ($L_2$) is sensed by a pulse generator 168 and demodulator unit 170. As shown, the outputs of the demodulators 166 and 170 are connected through switch means 172 to leads 174 and 176. The switch means 172 is controlled by the mill drive direction selector 114, the arrangement being such that when the strip 16 is travelling from left to right, the output of pulse generator 164 which represents input strip length ($L_1$) is connected to lead 174, and the output of pulse generator 168 which represents output strip length ($L_2$) is connected to lead 176. When, however, the direction of strip travel through the mill is reversed, the switch 172 will reverse the connections between the demodulators 166 and 170 and the leads 174 and 176. That is, when the strip is travelling from right to left, the output of pulse generator 168 will then represent input strip length ($L_1$) so that the demodulator 170 will then be connected to lead 174 rather than lead 176. Similarly, under the conditions described, the output of pulse generator 164 will represent the output strip length ($L_2$) so that the demodulator 166 will now be connected to lead 176 rather than lead 174.

For purposes of explanation, it will be assumed that the strip is travelling from left to right so that the output of pulse generator 164 is connected to lead 174 while the output of pulse generator 168 is connected to lead 176. Connected to the lead 174 is another lead 178 which applies the pulses or oscillations representing the input strip length ($L_1$) to a first $L_1$ counter 180 which may, for example, be of the conventional flip-flop type comprising a plurality of multivibrators connected in cascade. The counter 180 is preset whereby it will trigger multivibrator 182 to produce an output pulse whenever the counter 180 reaches the count to which it was preset. In the illustration given, the counter 180 will be preset to trigger multivibrator 182 each time the input strip moves through six inches. Thus, assuming that the gate 134 is not disabled by a synchronizer 184, hereinafter described, a pulse from circuit 182 will pass through the gate 134 to the reset windings 142 on cores 140, 150, etc. and also to the blocking oscillator 132. The output pulse from the blocking oscillator 132, however, will be delayed with respect to that on lead 158 directly from gate 134, the arrangement being such that each of the cores 140, 150, etc. will shift the information stored therein before new information is fed into the system from valve 112.

The pulses or oscillations on leads 174 and 176 are also passed to gate circuits 190 and 192, respectively. The output of gate circuit 190 is then passed to a second $L_1$ counter 194, the count of which is preset by means of a $G_{2d}$ preset circuit 196. The $L_1$ counter 194, like counter 180, may comprise any of the well known types having a series of cascade-connected multivibrators. As is well known to those skilled in the art, a counter of this type may be preset by a series of switch closures to count any desired number of oscillations before producing an output pulse. The circuit 196, therefore, comprises a plurality of switches which may be closed to preset the counter 194 to count the desired number of oscillations.

When the desired number of oscillations or pulses are counted by counter 194, it will produce an output to trigger the synchronizer 184 through multivibrator 198. At this point, the synchronizer will then disable the gate 134 through lead 200 while enabling the parallel binary subtractor circuit 162 through lead 202 to perform a binary subtraction. At the same time, the synchronizer 184 will block gates 190 and 192 through lead 204.

Reverting, now, to gate 192, its output is passed through lead 206 to an $L_2$ counter 208 which will produce a binary output on ten leads 210 which is proportional to the number of oscillations or pulses counted by the $L_2$ counter. The $L_2$ counter is of the well-known type comprising a plurality of cascaded flip-flop circuits and is reset to begin counting from zero by a signal from synchronizer 184 through lead 212. At the same time the $L_2$ counter 208 is reset, the $L_1$ counter 194 is also reset by synchronizer 184 through lead 207, substantially as shown.

It will be remembered that an error signal proportional to the deviation in gage from a desired output gage is derived from the equation:

(6) $$\text{Error} = G_1 - \frac{L_2}{L_1} G_{2d}$$

The factor $G_1$ which is the actual input gage of the strip material directly at the bite of the mill is represented by the binary signal comprising 11 ON or OFF bits on leads 160 leading into the parallel binary subtractor 162. Similarly, the binary signal comprising 11 ON or OFF bits on leads 210 leading into the subtractor must represent the factor $$\frac{L_2}{L_1} G_{2d}$$

in order to obtain the correct error signal.

The factor $$\frac{L_2}{L_1} G_{2d}$$

is calculated as follows: It will be remembered that the second $L_1$ counter 194 may be preset to count any number of pulses or oscillations by an appropriate number of switch closures in circuit 196. By setting the switch closures so that the desired output gage $G_{2d}$ is equal in magnitude to $L_1$, the error equation becomes:

(7) $$\text{Error} = G_1 - L_2$$

In other words, the $L_1$ counter 194 is set to trigger multivibrator 198 whenever $L_1$ is equal to $G_{2d}$. When this occurs, the synchronizer 184 is actuated by the signal from multivibrator 198 to disable the gates 190 and 192 through lead 204 whereby both the $L_1$ counter 194 and the $L_2$ counter 208 stop counting. The output of the $L_2$ counter at this instant then represents the factor $$\frac{L_2}{L_1} G_{2d}$$

or the desired calculated input gage $\overline{G}_1$. At the same time, the synchronizer enables the subtractor 162 to perform a parallel binary subtraction of the calculated desired input gage ($\overline{G}_1$) from the actual input gage at the bite of the mill ($G_1$) to produce a binary output error signal schematically illustrated by the lead 214.

While the subtraction process is being performed, the synchronizer 184 blocks gate 134 so that no further information can pass through bit lines 0–10 during the subtraction process. After the subtraction process is then completed, the synchronizer will reset the $L_1$ and $L_2$ counters 194 and 208 through leads 207 and 212 and will enable the gates 190 and 192 to pass $L_1$ and $L_2$ pulses or oscillations to the counters to begin a new cycle. In this way, samples of the error signal ($G_1 - \overline{G}_1$) are obtained at spaced points along the strip 16, and the number of samples taken is dependent upon the preset value of $G_{2d}$ in switch closure circuit 196. That is, circuit 196 determines the number of oscillations (i.e., the length of the strip) required to produce the signal to trigger the synchronizer 184; and this, in turn, depends upon the desired value of $G_{2d}$.

Operation of the system may possibly best be understood by reference to FIG. 2 where wave form A represents the oscillations ($L_1$) on lead 174. These oscillations, when fed to the first $L_1$ counter 180 will cause the multivibrator 182 to produce an output pulse to gate 134 after every six inches of strip travel. The pulses in wave form B, then, are those which are passed through windings 142 in the cores 140, 150, etc. to shift the cores and advance the information through the memory unit each time the strip travels six inches. The output of the blocking oscillator 132, on the other hand, is represented by wave form C in FIG. 2 where the pulses have the same frequency as those in wave form B but are delayed with respect to the pulses in wave form B. Thus, as was mentioned above, the cores are first shifted to advance information to the memory unit, followed by the introduction of new information into the unit from valve 112.

During the time that wave forms B and C are being generated, the wave form A is fed also to the second $L_1$ counter 194 which is preset by circuit 196. After the $L_1$ counter 194 has counted a predetermined number of pulses or oscillations in wave form A determined by the setting of circuit 196, it will trigger multivibrator 198 to produce an output pulse 209 in wave form D of FIG. 2. The pulse 209 in wave form D then actuates the synchronizer 184 to produce the pulse 211 in wave form E on lead 202 which enables the binary subtractor circuit 162 to perform a subtraction operation between times $T_1$ and $T_2$. At time $T_2$, a pulse 213 is produced in wave form F, and this pulse is fed through leads 207 and 212 to the $L_1$ and $L_2$ counters to reset them whereby they will again start counting from zero, the pulse in wave form F persisting between times $T_2$ and $T_3$. Wave form G from the synchronizer 184 is fed through leads 200 and 204 to gates 134, 190 and 192. This wave form includes a pulse 215 which starts at time $T_1$ and persists for a short time after $T_3$, thereby disabling the gates 134, 190 and 192 and preventing the feed-in of information to the cores 140, 150, 154, etc. as well as the counters 194 and 208 during the period of subtraction.

The output of the binary subtractor 162 on lead 214 is a binary signal having a magnitude proportional to the difference between the actual measured input gage ($G_1$) and the calculated desired input gage ($\overline{G}_1$). This signal is passed through a dead zone and alarm set circuit 216 and a time control circuit 218 to the mill screwdown control 220. If the output of the subtractor 162 indicates that the gage is above $G_{2d}$, a signal will be fed on lead 222 to the mill screw control 224 to lower the upper roll 12. Similarly, if the output of the subtractor 162 indicates that the gage is below $G_{2d}$, a signal will be fed on lead 226 to the screw control 224 to raise the roll 12. Also connected to the mill screwdown control circuit 220 are two alarms 228 and 230. Alarm 228 will be actuated to signal the operator that the error signal is above a predetermined magnitude while alarm 230 will signal the operator that the error signal is below a predetermined magnitude. In this manner, when the mill initially starts up and the $G_1$ information fed through the storage circuit of cores 140, 148, etc. is obviously incorrect, since it was derived from strip previously rolled, the operator will be apprised of this fact by one of the alarms 228 or 230. Included in the system is switching means, not shown, enabling the operator to place the screw control 224 on either manual or automatic operation wherein the output of the subtractor 162 controls. This enables the operator to control the mill by manual means until the alarm ceases, indicating that the correct $G_1$ information has arrived at the outputs of bit lines 0–10.

The invention thus provides a mill screwdown control based on the constant volume principle which derives an error signal by comparison of actual input gage of the material at the bite of the mill with calculated desired input gage, and wherein the latter factor is derived in an electrical computer from a consideration of the factors $L_1$, $L_2$ and $G_{2d}$ only while ignoring any other factors such as the W and K factors employed in previous systems of this type. At the same time, contrary to what might be expected, a uniform output gage is derived, notwithstanding the fact that the aforesaid factors are eliminated.

Although the invention has been shown in connection with a certain specific embodiment, it will be readily apparent to those skilled in the art that various changes in form and arrangement of parts may be made to suit requirements without departing from the spirit and scope of the invention. In this respect, it will be apparent that the binary error signal $G_1 - \overline{G}_1$ derived from the subtractor 162 may be used to vary the tension in strip 16 rather than the screw control 224 with the same overall effect (i.e., a constant and uniform output gage).

We claim as our invention:

1. In an electrical control system for a mill gage varying device based upon the principle of constant volume of material entering and leaving the mill and wherein the deviation from a desired output gage of the material is represented by an electrical signal proportional to $$G_1 - \frac{L_2}{L_1}G_{2d}$$

where $G_1$ is the actual gage of the material entering the bite of the mill, $L_2$ is the actual length of the material leaving the mill for a given volume entering the mill, $L_1$ is the actual length of the material entering the mill for said given volume, and $G_{2d}$ is the desired output gage of the material leaving the mill; the combination of an actual gage measuring device for deriving an electrical signal which varies as a function of $G_1$, a first pulse generator for generating a number of pulses proportional to $L_1$, a second pulse generator for generating a number of pulses proportional to $L_2$, a first counter for counting the pulses from said first pulse generator, a second counter for counting the pulses from the second pulse generator and adapted to produce an output signal which varies as a function of $L_2$, means for presetting said first counter to produce an output signal when the number of pulses counted by said first counter is equal in magnitude to $G_{2d}$, and apparatus operable in response to the output signal from said first counter for electrically subtracting the output signal from said actual gage measuring device and the signal from said second counter to produce an error signal for controlling said mill gage varying device.

2. In an electrical control system for a mill gage varying device based upon the principle of constant volume of material entering and leaving the mill and wherein the deviation from a desired output gage of the material is represented by an electrical signal proportional to $$G_1 - \frac{L_2}{L_1}G_{2d}$$

where $G_1$ is the actual gage of the material entering the bite of the mill, $L_2$ is the actual length of the material leaving the mill for a given volume entering the mill, $L_1$ is the actual length of the material entering the mill for said given volume, and $G_{2d}$ is the desired output gage of the material leaving the mill; the combination of an actual gage measuring device for deriving a binary electrical signal comprising a plurality of bits which together represent the quantity $G_1$, a first pulse generator for generating a number of pulses proportional to $L_1$, a second pulse generator for generating a number of pulses proportional to $L_2$, a first counter for counting the pulses from said first pulse generator, a second counter for counting the pulses from the second pulse generator and adapted to produce a binary electrical output signal comprising a plurality of binary bits which represent the quantity $L_2$, means for presetting said first counter to produce an output signal when the number of pulses counted by said first counter is equal in magnitude to $G_{2d}$, and binary subtractor apparatus operable in response to the output signal from said first counter for electrically subtracting the binary signal from said actual gage measuring device and the signal from said second counter to produce an error signal for controlling said mill gage varying device.

3. In an electrical gage control system for a mill screwdown based upon the principle of constant volume of material entering and leaving the mill and wherein the deviation from a desired output gage of the material is represented by an electrical signal proportional to $$G_1 - \frac{L_2}{L_1}G_{2d}$$

where $G_1$ is the actual gage of the material entering the bite of the mill, $L_2$ is the actual length of the material leaving the mill for a given volume entering the mill, $L_1$ is the actual length of the material entering the mill for said given volume, and $G_{2d}$ is the desired output gage of the material leaving the mill; the combination of a device for deriving an electrical signal which varies as a function of $G_1$, a first pulse generator for generating a number of pulses proportional to $L_1$, a second pulse generator for generating a number of pulses proportional to $L_2$, a first counter for counting the pulses from said first pulse generator, a second counter for counting the pulses from the second pulse generator and adapted to produce an output signal which varies as a function of $L_2$, means for presetting said first counter to produce an output signal when the number of pulses counted by said first counter is equal in magnitude to $G_{2d}$, apparatus adapted to electrically subtract the output signal from said device and the signal from said second counter to produce an error signal for controlling said mill screwdown, and synchronizing means responsive to the output signal from said first counter for enabling said subtracting apparatus to perform a subtraction operation while at the same time stopping said first and second counters during the subtraction process.

4. In an electrical gage control system for a mill screwdown based upon the principle of constant volume of material entering and leaving the mill and wherein the deviation from a desired output gage of the material is represented by an electrical signal proportional to $$G_1 - \frac{L_2}{L_1} G_{2d}$$

where $G_1$ is the actual gage of the material entering the bite of the mill, $L_2$ is the actual length of the material leaving the mill for a given volume entering the mill, $L_1$ is the actual length of the material entering the mill for said given volume, and $G_{2d}$ is the desired output gage of the material leaving the mill; the combination of an actual gage measuring device for deriving an electrical signal which varies as a function of $G_1$, a first pulse generator for generating a number of pulses proportional to $L_1$, a second pulse generator for generating a number of pulses proportional to $L_2$, a first counter for counting the pulses from said first pulse generator, a second counter for counting the pulses from the second pulse generator and adapted to produce an output signal which varies as a function of $L_2$, gate circuits connecting the first and second pulse generators to the first and second counters, respectively, means for presetting said first counter to produce an output signal when the number of pulses counted by said first counter is equal in magnitude to $G_{2d}$, apparatus adapted to electrically subtract the output signal from said actual gage measuring device and the signal from said second counter to produce an error signal for controlling said mill screwdown, and synchronizing means responsive to the output signal from said first counter for producing a gating pulse to disable said gate circuits while at the same time enabling said subtracting apparatus to perform a subtraction operation and thereafter reset said second counter to begin counting from zero before the gating pulse is removed from the gate circuits to enable the same to pass pulses to the first and second counters.

5. A system based on the constant volume principle for automatically controlling the operation of a mill gage varying device to produce a uniform desired output gage in strip material passing through the mill comprising, in combination, means for measuring the actual input gage of strip material entering the mill, an entry gage memory unit, said entry gage memory unit containing stored material entry gage measurements from said means for measuring the actual input gage of the strip material entering the mill, means for advancing material entry gage measurements through said entry gage memory unit in synchronous correlation with the advancement of strip material through the mill, means in said automatic control system for measuring the actual input length of material entering the mill, means in said automatic control system for measuring the actual output length of material leaving the mill, means for inserting desired output gage measurement of the strip material into said automatic control system, means in the automatic control system for computing the calculated desired output gage of strip material leaving the mill from a consideration of the actual length of the strip material entering the mill, the actual length of strip material leaving the mill and said inserted desired output gage measurement, and means for producing an error signal to control said mill gage varying device by comparison of said calculated desired material entry gage and said actual material entry gage measurements which have been advanced through said entry gage memory unit.

6. In a system for controlling a mill based on the principle of constant volume of material entering and leaving the mill, the combination of first means for producing an electrical signal which varies as a function of the length of strip material entering the mill, second means for producing an electrical signal which varies as a function of the length of strip material leaving the mill, third means for producing an electrical signal proportional in magnitude to the desired output gage of strip material leaving the rolling mill, and computer apparatus responsive to only those electrical signals produced by said first, second and third means for calculating the desired input gage of strip material entering the mill.

7. In a system for controlling a mill based on the principle of constant volume of material entering and leaving the mill, the combination of first means for producing an electrical signal which varies as a function of the length of strip material entering the rolling mill, second means for producing an electrical signal which varies as a function of the length of strip material leaving the rolling mill, third means for producing an electrical signal proportional in magnitude to the desired output gage of strip material leaving the rolling mill, computer apparatus responsive to only the electrical signals produced by said first, second and third means for calculating the desired input gage of strip material entering the mill and for producing an output signal which varies as a function of said calculated desired input gage, fourth means for producing an electrical signal which varies as a function of the actual input gage of strip material entering the bite of the mill, and apparatus responsive to the signals from said fourth means and said computing apparatus to derive an electrical signal for controlling said rolling mill screwdown.

8. In a system for controlling a mill in accordance with the principle of constant volume of material entering and leaving the mill by comparison of actual measured material entry gage and calculated desired material entry gage; the improvement of means including electrical computer apparatus for deriving calculated desired material entry gage by comparison of only the three factors of actual input length of material entering the mill, actual output length of material leaving the mill, and selected desired output gage.

References Cited in the file of this patent
UNITED STATES PATENTS

| | | |
|---|---|---|
| 2,982,158 | Orbom | May 2, 1961 |
| 3,015,974 | Orbom et al. | Jan. 9, 1962 |
| 3,054,311 | Murtland | Sept. 18, 1962 |

OTHER REFERENCES

Flat Rolled Products, pages 7–9, Jan. 21, 1959. (Copy in Div. 13, TS–340–m4–c.2.)